United States Patent [19]

Yasumura et al.

[11] Patent Number: 4,642,326

[45] Date of Patent: Feb. 10, 1987

[54] POLYVINYLIDENE FLUORIDE BASE BLEND POLYMER

[75] Inventors: Takashi Yasumura, Fujimi; Toshio Koishi, Sakado; Isao Tanaka, Kawagoe, all of Japan

[73] Assignee: Central Glass Company, Limited, Ube, Japan

[21] Appl. No.: 671,943

[22] Filed: Nov. 16, 1984

[30] Foreign Application Priority Data

Nov. 18, 1983 [JP] Japan .................. 58-216340

[51] Int. Cl.$^4$ ............................................. C08L 27/16
[52] U.S. Cl. ................................... 525/153; 525/199; 528/220
[58] Field of Search ............... 525/153, 199; 528/220

[56] References Cited

U.S. PATENT DOCUMENTS 3,322,721  5/1967  Howard, Jr. ................. 525/153
4,200,568  4/1980  Trautvetter et al. ......... 525/199

FOREIGN PATENT DOCUMENTS 55-35042  9/1980  Japan .

*Primary Examiner*—Allan M. Lieberman
*Attorney, Agent, or Firm*—Fleit, Jacobson, Cohn & Price

[57] ABSTRACT

A blend polymer composition, which is superior to polyvinylidene fluoride (PVDF) in impact resistance and retains favorable properties of PVDF, is obtained by blending 1-100 parts, and preferably 1-50 parts, by weight of a copolymer of vinylidene fluoride (VDF) and hexafluoroacetone (HFA) with 100 parts by weight of PVDF. Preferably the mole ratio of copolymerized VDF to HFA is from 96:4 to 50:50.

2 Claims, 1 Drawing Figure

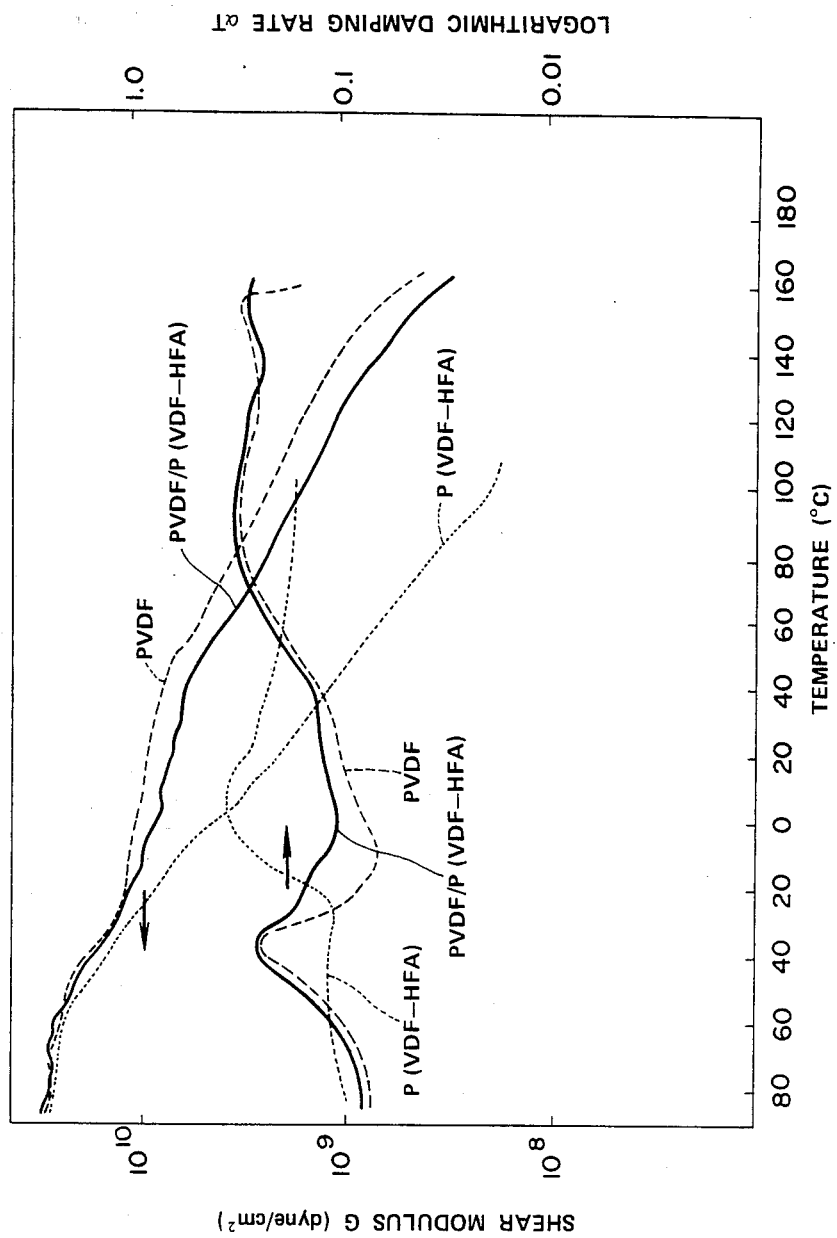

POLYVINYLIDENE FLUORIDE BASE BLEND POLYMER

BACKGROUND OF THE INVENTION

This invention relates to a blend polymer composition which is obtained by blending a fluorine-containing copolymer with polyvinylidene fluoride and meets a general desire to improve the impact resistance of polyvinylidene fluoride.

Among conventional fluorohydrocarbon resins, polyvinylidene fluoride (abbreviated to PVDF) has excellent mechanical and electrical properties and is very stable to corrosive chemicals and also to ultraviolet rays and radioactive rays and, besides, is superior in workability. Accordingly PVDF has wide applications and is largely used for laminating or coating metallic materials, for covering electric wires and cables and for molding machine elements such as valves besides general uses in the form of film, sheet or pipe.

PVDF is a crystalline resin, and some favorable physical properties of this resin are attributed to the high degree of crystallinity. On the other hand, PVDF lacks elasticity by reason of high degree of crystallinity and therefore has some shortcomings. For example, PVDF coverings on electric wires tend to spontaneously crack during storage, and PVDF sheets formed by extrusion or drawing are liable to be relatively low in tear strength because of the occurrence of significant molecular orientation during the sheet-forming process. Furthermore, in respect of impact resistance PVDF can hardly be said to be better than other fluorohydrocarbon resins. It is often experienced that the existence of small scratches or other defects on the surfaces of molded articles of PVDF becomes the cause of breaking of the articles by shocks of relatively small magnitude.

Some proposals have been made to obtain PVDF base resins which are less crystalline than PVDF itself and more elastic than PVDF by copolymerization of vinylidene fluoride (abbrevitated to VDF) with another suitable monomer or by blending PVDF with a plasticizer and/or a different kind of synthetic resin. However, the attempts to substantially lessen the crystallinity of PVDF by copolymerization have not been fully successful mainly because the resultant copolymers become considerably lower in melting point or softening point as the modulus of elasticity is lowered, so that restrictions are placed on the use of the copolymers at high temperatures. Besides, in many cases the copolymers are not comparable to PVDF in workability. The attempts to obtain a good blend of PVDF with either a plasticizer or a relatively soft resin have encountered a problem that the available plasticizers and resins are mostly poor in compatibility with PVDF, so that it is difficult to obtain a blend which is macroscopically homogeneous and retains favorable physical properties of PVDF.

It was reported that blending of PVDF with polymethyl acrylate, which is good in compatibility with PVDF, gives a blend polymer which is fairly soft and elastic and excellent in drawability. (Japanese patent application publication No. 55-35042 (1980)). However, in such a blend polymer the improvement in the elasticity is inevitably accompanied by degradation of chemical resistance and weatherability, which is very high in the case of PVDF, since the content of fluorine in the blend decreases as the proportion of polymethyl acrylate is increased. Also blending PVDF with a fluorine-containing polymer, which is called a fluorine rubber or a fluoroelastomer, was considered. Actually, however, such blending has not given good results because conventional fluoroelastomers are generally unsatisfactory in compatibility with PVDF so that in many cases it is difficult to blend a sufficient amount of fluoroelastomer with PVDF, and the blend polymers are liable to become locally heterogeneous and, therefore, inferior in mechanical properties.

SUMMARY OF THE INVENTION

It is an object of the present invention to provide a very effective measure for the improvement of low impact resistance of PVDF.

More particularly, it is an object of the invention to provide a novel PVDF base blend polymer composition which is greatly higher in impact resistance than PVDF and is almost comparable to PVDF in other important properties such as relatively high modulus of elasticity, high resistance to chemicals and good workability.

A blend polymer composition according to the invention comprises 100 parts by weight of a polyvinylidene fluoride resin and 1 to 100 parts by weight of a copolymer of vinylidene fluoride and hexafluoroacetone.

We have found that a copolymer of VDF with hexafluoroacetone (abbreviated to HFA), in which the mole ratio of VDF to HFA is preferably in the range from 96.0:4.0 to 50.0 to 50.0, is fairly good in compatibility with PVDF. This copolymer itself is very high in impact resistance and chemical resistance and has good workability. A disadvantage of this copolymer is significant temperature dependence of its rigidity or elastic modulus over a wide temperature range containing room temperature and extending far upward. Accordingly there are rather strict limitations on the use of this copolymer as an independent synthetic resin. However, we have discovered that when PVDF is blended with an adequate amount of a VDF-HFA copolymer the resultant blend polymer is remarkably higher in impact resistance than PVDF and does not exhibit such great temperature dependence of rigidity as in the case of the VDF-HFA copolymer itself. Furthermore, the blend polymer does not significantly differ from and, rather, is comparable to PVDF in many other important and favorable properties such as high tensile strength, high rigidity, high resistance to chemicals, good weatherability and good workability.

The favorable properties characteristic of PVDF are primarily attributed to C—F bond in this polymer. In the present invention use is made of a VDF-HFA copolymer which also has C—F bond. Accordingly it is possible to retain the favorable properties of PVDF even when a considerably large amount of this copolymer is blended with PVDF.

In a blend polymer composition according to the invention, the VDF-HFA copolymer serves as an impact resistance improving component, which is naturally required to be low in the degree of crystallinity if not truly noncrystalline and so low in elastic modulus that it can be called a soft and flexible resin. The blending will not produce the desired effect if the compatibility of the copolymer with PVDF is so good that the blend polymer has an ideally homogeneous structure in a microscopic sense or so poor that the blend polymer becomes apparently heterogeneous. It is desirable that small particles of the VDF-HFA copolymers are uniformly dispersed in a matrix of PVDF such that there is a dynamic interaction between the copolymer particles and PVDF of the matrix, and such a desirable structure can be realized in a blend polymer of the invention. In this respect it is preferable to blend 1 to 50 parts by weight of a VDF-HFA copolymer with 100 parts by weight of PVDF, and such proportions are desirable also for affording very well balanced properties to the blend polymer.

BRIEF DESCRIPTION OF THE DRAWINGS

The single FIGURE is a graph showing the manner of dependence of the rigidity of a blend polymer according to the invention upon temperature in comparison with PVDF and a VDF-HFA copolymer.

DESCRIPTION OF THE PREFERRED EMBODIMENTS

Commercial PVDF resins of various grades are of use for the present invention. That is, PVDF as the primary material in this invention may be either a homopolymer of VDF or a modified PVDF obtained by copolymerization of a dominantly large amount of VDF and a small amount of another kind of monomer conventionally used in preparing PVDF resins.

A VDF-HFA copolymer is obtained by copolymerizing 20–90 mole % of VDF and 80–10 mole % of HFA in the presence of a popular radical polymerization initiator by either a solution polymerization method or a bulk polymerization method. The copolymerization reaction is carried out at a temperature in the range from about −45° to 100° C., and preferably in the range from 0° to 70° C. As mentioned hereinbefore, it is preferred to use a VDF-HFA copolymer in which the mole ratio of VDF to HFA is from 96.0:4.0 to 50.0:50.0. It is desirable that the intrinsic viscosity ($\eta$) of the VDF-HFA copolymer measured as a solution in dimethylacetamide at 30° C. falls in the range from 0.3 to 3.0 dl/g, and preferably in the range from 0.5 to 2.0 dl/g.

Blending of PVDF with VDF-HFA copolymer can easily be accomplished by a conventional method for the manufacture of a thermoplastic blend polymer, for example by kneading a dry mixture of PVDF and VDF-HFA copolymer at a temperature above about 150° C.

Forming or molding of a blend polymer composition of the present invention can be accomplished by a conventionl forming or molding method for thermoplastic resins, such as extrusion, calendering or injection molding.

The invention will further be illustrated by the following nonlimitative examples.

EXAMPLE 1

A copolymer of VDF and HFA was prepared by the following process.

Initially, 17 liters of refined 1,1,2-trichloro-1,2,2-trifluoroethane (referred to as R-113) and 150 g of 5% solution of perfluorobutyryl peroxide in R-113 were charged in a 30-liter autoclave, and the atmosphere in the autoclave was replaced by nitrogen gas. Then, 1.25 kg of HFA monomer and 1.90 kg of VDF monomer were introduced into the autoclave and subjected to polymerization for 24 hr while maintaining the reaction temperature at 20° C. and continuing stirring. After the reaction, unreacted portions of the monomers were recovered to leave a reaction product in the form of slurry. The slurry was poured into a large volume of methanol to cause precipitation of a copolymer in the form of white powder, which was recovered by filtration, washed and dried. The dried copolymer weighed 1.85 kg.

Elementary analysis of the thus prepared copolymer revealed that the mole ratio of copolymerized VDF to HFA was 92.8:7.2. By thermal analysis with a differential scanning calorimeter (DSC), the copolymer exhibited a melting point (peak temperature) of 131° C. By measurement in dimethylacetamide at 30° C. the intrinsic viscosity ($\eta$) of the copolymer was 1.31 dl/g.

This VDF-HFA copolymer was mixed with PVDF (Kynar 460 pellets of Pennwalt Co.) in three different proportions, and each mixture was kneaded by means of two 4-inch rolls at a kneading temperature of 170° C. for 5 min. In every mixture the quantity of PVDF was 100 g, whereas the quantity of the VDF-HFA copolymer was varied to 5.3 g, 11.1 g and 17.6 g. Consequently the three kinds of blend copolymers produced in this example respectively contained about 5 wt %, about 10 wt %, and about 15 wt % of the VDF-HFA copolymer.

Each of these blend copolymers was press-shaped at 220° C. into a sheet of 1 mm thickness and subjected to a tensile test and a chemical resistance test which was immersion of the samples in 97% sulfuric acid, in 35% hydrochloric acid, in 50% hydrofluoric acid and in 30% aqueous solution of sodium hydroxide, respectively, for 7 days at room temperature. Besides, each blend polymer was subjected to an Izod impact test using notched specimens 12.7×11.0 mm rectangular by 63.5 mm long. For comparison, the VDF-HFA copolymer itself and the PVDF resin (Kynar 460) were also subjected to the same tests. The test results were as shown in Table 1.

TABLE 1

| Polymer | Tensile Strength (kg/cm$^2$) | | Elongation at Break (%) | Izod Impact Value (kg · cm/cm) | Chemical Resistance |
|---|---|---|---|---|---|
| | Yield Point | Breaking Point | | | |
| PVDF | 470 | 330 | 100 | 9 | excellent |
| P(VDF-HFA) | 160 | 310 | 540 | — | excellent |
| Blend Polymer PVDF/P(VDF-HFA) | | | | | |
| 95% wt %/5 wt % | 460 | 320 | 110 | >50 | excellent |
| 90 wt %/10 wt % | 430 | 310 | 130 | >50 | excellent |
| 85 wt %/25 wt % | 370 | 300 | 300 | >50 | excellent |

Note:
chemical resistance was judged to be excellent when increase or decrease in the weight of every sample was not more than 2%.

EXAMPLE 2

A copolymer of VDF and HFA was prepared by the same process as in Example 1 except that the quantity of HFA monomer was increased to 1.66 kg and the quantity of VDF monomer was decreased to 1.69 kg. The dry weight of the copolymer in powder form was 1.64 kg. By elementary analysis the mole ratio of copolymerized VDF to HFA was found to be 91.0:9.0. By DSC analysis the copolymer exhibited a melting point (peak temperature) of 122° C. By measurement in dimethylacetamide at 30° C. the intrinsic viscosity ($\eta$) of the copolymer was 1.10 dl/g.

This VDF-HFA copolymer was mixed with PVDF (Kynar 740 pellets of Pennwalt Co.) in three different proportions, i.e. 5 g to 100 g, 10 g to 100 g, and 20 g to 100 g, and each mixture was kneaded in the same manner as in Example 1. Each of these blend polymers was subjected to a tensile test using specimens of 1 mm thickness and to Izod impact test using notched specimens 12.7×3.0 mm rectangular by 63.5 mm long. Besides, each blend polymer was subjected to a flow test in which a melt of each polymer at 240° C. was forced to flow out of an orifice 1 mm in diameter and 10 mm in length under a load of 100 kg. For comparison, the VDF-HFA copolymer itself and PVDF (Kynar 740) were also subjected to the same tests. The results are shown in Table 2.

Furthermore, the rigidity of the blend polymer composed of 100 parts by weight of PVDF (Kynar 740) and 20 parts by weight of the VDF-HFA copolymer was measured at various temperatures by the torsion pendulum method (B) for the testing of shear modulus and mechanical damping of plastics specified in Japanese Industrial Standard JIS K 7213. For comparison, the VDF-HFA copolymer itself and PVDF (Kynar 740) were also tested by the same method. The results are shown in the single FIGURE. As can be seen in the FIGURE, at temperatures above about −20° C. the VDF-HFA copolymer exhibited very greater lowering of rigidity than PVDF although at lower temperatures the copolymer was almost comparable in rigidity to PVDF. However, the blend polymer composed of 100 parts of PVDF and 20 parts of the VDF-HFA copolymer was nearly similar to PVDF in the dependence of rigidity on temperature even at considerably high temperatures.

EXAMPLE 3

A copolymer of VDF and HFA was prepared by the same process as in Example 1 except that the quantity of HFA monomer was increased to 3.07 kg and the quantity of VDF monomer was decreased to 1.18 kg. The dry weight of the copolymer in powder form was 0.85 kg. By elementary analysis the mole ratio of copolymerized VDF to HFA was found to be 72.1:27.9. By DSC analysis the copolymer exhibited a melting point (peak temperature) of 90° C. By measurement in dimethylacetamide at 30° C. the intrinsic viscosity ($\eta$) of the copolymer was 0.80 dl/g.

This copolymer was mixed with PVDF (Kynar 740 pellets) in three different proportions, i.e. 2.5 g to 100 g, 5 g to 100 g, and 10 g to 100 g, and each mixture was kneaded in the same manner as in Example 1. These blend polymers were subjected to a tensile test using specimens of 1 mm thickness and to an Izod impact test using specimens 12.7×3.0 mm rectangular by 63.5 mm long. For comparison, the VDF-HFA copolymer itself and PVDF (Kynar 740) were also subjected to the same tests. The results are shown in Table 3.

TABLE 3

| Polymer | Tensile Strength ($kg/cm^2$) | | Elongation at Break (%) | Izod Impact Value (kg·cm/cm) |
|---|---|---|---|---|
| | Yield Point | Breaking Point | | |
| PVDF | 510 | 350 | 100 | 13 |
| P(VDF-HFA) | 60 | 130 | 720 | — |
| Blend Polymer PVDF/ P(VDF-HFA) | | | | |
| 100/2.5 | 490 | 340 | 110 | 23 |
| 100/5 | 460 | 320 | 140 | 40 |
| 100/10 | 430 | 300 | 250 | 80 |

What is claimed is:
1. A blend polymer composition comprising:
   100 parts by weight of a polyvinylidene fluoride resin; and
   1 to 100 parts by weight of a copolymer of vinylidene fluoride and hexafluoroacetone;
   wherein the mole ratio of vinylidene fluoride to hexafluoroacetone in said copolymer is in the range from 96:4 to 50:50.
2. A blend polymer composition according to claim 1, wherein the amount of said copolymer is 1 to 50 parts by weight.

* * * * *

TABLE 2

| Polymer | Tensile Strength ($kg/cm^2$) | | Elongation at Break (%) | Izod Impact Value (kg·cm/cm) | Flow Value ($\times 10^{-2}$ ml/sec) |
|---|---|---|---|---|---|
| | Yield Point | Breaking Point | | | |
| PVDF | 510 | 350 | 100 | 13 | 1.1 |
| P(VDF-HFA) | 120 | 270 | 580 | — | 2.6 |
| Blend Polymer PVDF/P(VDF-HFA) | | | | | |
| 100/5 | 480 | 345 | 110 | 32 | 1.1 |
| 100/10 | 460 | 340 | 120 | 62 | 1.4 |
| 100/20 | 400 | 345 | 200 | 71 | 2.6 |